United States Patent [19]

Tanaka et al.

[11] Patent Number: 4,709,968
[45] Date of Patent: Dec. 1, 1987

[54] FLUID PRESSURE CONTROL APPARATUS FOR REDUCING SWING OR FALL OF VEHICLE BODY DUE TO BRAKING DURING BACKWARDS RUNNING OF VEHICLE

[75] Inventors: Ryuichi Tanaka; Akira Ishii, both of Kanagawa, Japan

[73] Assignee: Nippon Air Brake Co., Ltd., Kobe, Japan

[21] Appl. No.: 862,043

[22] Filed: May 12, 1986

[30] Foreign Application Priority Data

May 17, 1985 [JP] Japan .............................. 60-73030[U]

[51] Int. Cl.⁴ ............................................. B60T 13/00
[52] U.S. Cl. ............................... 303/6 C; 188/151 A; 188/349; 303/3; 60/591
[58] Field of Search ............................ 303/6 C, 2-3, 303/6 R, 15, 6 A, 22 A, 24 A, 20, 119; 192/4 A, 3 R, 4 C, 3 H, 13 R, 13 A; 60/591, 545; 188/349, 195, 151 A

[56] References Cited

U.S. PATENT DOCUMENTS

| 3,653,722 | 4/1972 | Klimek | 303/6 C |
|---|---|---|---|
| 3,701,567 | 10/1972 | Shutt et al. | 188/349 X |
| 3,712,683 | 1/1973 | Keady et al. | 188/349 X |
| 3,729,237 | 4/1973 | Ishikawa et al. | 303/6 C X |
| 3,975,059 | 8/1976 | Orzel | 303/6 C |
| 4,358,163 | 11/1982 | Young | 303/22 R |
| 4,431,235 | 2/1984 | Cheron et al. | 303/6 C X |
| 4,600,245 | 7/1986 | Watanabe | 303/119 X |
| 4,610,338 | 9/1986 | Kubota et al. | 192/4 A X |
| 4,623,199 | 11/1986 | Steel | 303/15 |

FOREIGN PATENT DOCUMENTS 59-67150  4/1984  Japan .
61-46748  3/1986  Japan .

Primary Examiner—Douglas C. Butler
Attorney, Agent, or Firm—Dennis J. Williamson; James P. Ryther

[57] ABSTRACT

A fluid pressure control apparatus for a vehicle includes: an inlet port connected to a master cylinder; an outlet port connected to a wheel cylinder of a brake apparatus for a front wheel; a valve apparatus arranged in a path connecting the inlet and outlet ports; a movable plunger for closing and opening the valve apparatus, receiving fluid pressures at both sides; a first spring for urging the plunger in the direction to open the valve apparatus; an electromagnetic coil to be energized by a signal transmitted on the basis of the driver's operation for driving the vehicle backwards; the valve apparatus including a valve body which can be separated from and slated on a valve seat formed on the plunger; a second spring for urging the valve body to the first position where the valve body cannot contact with the valve seat of the plunger in spite of movement of the plunger; and the valve body being moved by energization of the electromagnetic coil to the second position where the valve body can contact with the valve seat of the plunger with movement of the plunger.

9 Claims, 5 Drawing Figures

FLUID PRESSURE CONTROL APPARATUS FOR REDUCING SWING OR FALL OF VEHICLE BODY DUE TO BRAKING DURING BACKWARDS RUNNING OF VEHICLE

BACKGROUND OF THE INVENTION

1. Field of the Invention

This invention relates to a fluid pressure control apparatus for a vehicle.

2. Description of the Prior Art

Hitherto, when the vehicle is braked, the fluid pressure from the master cylinder is transmitted, as it is, to the wheel cylinders of the front wheels, without reduction, both during forward running and during backward running.

Generally, when the 2L-type drum brake is employed for the front wheel, the braking force applied to the front wheel during forward running is considerably larger than the braking force applied to the front wheel during backward running, for the same brake fluid pressure, on the ground of the construction of the 2L-type drum brake. Accordingly, the forward falling amount of the automobile or vehicle which is braked during forwards running, is larger than the backward falling amount of the automobile or vehicle which is braked during backwards running. The forward falling of the automobile is so called "nose-dive phenomenon". The backward falling of the automobile is called provisionally "tail-dive phenomenon". The falling or swing of the automobile occurs due to the inertia of the center of the gravity of the automobile, when the wheels are braked. The load distributions to the front and rear wheels change due to the rotational force round the contact points between the front or rear wheel and the ground.

On the other hand, when the disc brake type is employed for the front wheel, the braking force applied to the front wheel during forward running is equal to the braking force applied to the front wheel during backward running, for the same brake fluid pressure.

Accordingly, when the 2L-type drum brake is substituted for the disc brake type, "the tail dive amount" becomes considerably large in comparison with the case when the 2L-type drum brake is employed.

A larger suspension mechanism of high quality to which a larger load may be applied, should be used for the rear wheels. Further, the suspension mechanism itself for the front wheels should be so altered as to prevent the above described "nose dive" and "tail dive".

As the result, the whole suspension mechanism for the front and rear wheels should be altered. The change of the brake type for the front wheel requires the alteration of the substantially whole construction of the automobile. However, the alteration merely copes with the phenomenon which occurs during backwards running. That is not so efficient. Further, there occur serveral problems such as the increase of the weight of the automobile and the lowering of the fuel consumption rate.

Also in the case that the brake type is not altered, the braking force obtained in the front wheel becomes considerably large by a relatively strong tread of the brake pedal during backwards running, and so the "tail dive" phenomenon becomes considerably remarkable. A large load is applied to the suspension mechanism. There occur some problems such as the lowering of the endurance and the damage.

In order to reduce the falling amount of the vehicle body by braking operation during backward running, such a fluid pressure control apparatus was proposed that comprises an inlet port connected to a master cylinder, an outlet port connected to a wheel cylinder of a front wheel brake apparatus, a valve apparatus arranged in a path connecting the inlet port with the outlet port, and being able to limit the communication between the inlet and outlet ports, a movable plunger receiving at least the fluid pressure at the side of the outlet port, and being able to open and close the valve apparatus, a spring for urging the plunger in the direction to open the valve apparatus, and an electromagnetic coil to be energized by a signal transmitted on the basis of the driver's operation for driving the automobile backwards, wherein the fluid pressure at the side of the outlet port can be reduced by the energization of the electromagnetic coil.

The above fluid pressure control apparatus further includes a control piston and a second valve apparatus arranged in a path connecting the chambers at both sides of the above plunger. The control piston is moved to close the second valve apparatus by the energization of the electromagnetic coil on the backward running. Thus, the fluid pressure at the side of the outlet port can be reduced by cooperation of the plunger and first-mentioned valve apparatus. Accordingly, the fluid pressure control apparatus is complicated in construction and large-sized.

SUMMARY OF THE INVENTION

Accordingly, it is an object of this invention to provide a fluid pressure control apparatus which can reduce the swing or falling of the vehicle body due to braking operation during backwards running, in simpler construction.

In accordance with an aspect of this invention, a fluid pressure control apparatus for a vehicle comprises: (A) an inlet port connected to a master cylinder; (B) an outlet port connected to a wheel cylinder of a brake apparatus for a front wheel; (C) a valve apparatus arranged in a path connecting said inlet and outlet ports; (D) a movable plunger for closing and opening said valve apparatus, receiving fluid pressures at both sides; (E) a fluid spring for urging said plunger in the direction to open said valve apparatus; (F) an electromagnetic coil to be energized by a signal transmitted on the basis of the driver's operation for driving said vehicle backwards; (G) said valve apparatus including a valve body which can be separated from and seated on a valve seat formed on said plunger; (H) a second spring for urging said valve body to the first position where said valve body cannot contact with said valve seat of the plunger in spite of movement of said plunger; and (I) said valve body being moved by energization of said electromagnetic coil to the second position where said valve body can contact with said valve seat of the plunger with movement of said plunger.

The foregoing and other objects, features, and advantages of the present invention will be more readily understood upon consideration of the following detailed description of the preferred embodiment of the invention, taken in conjunction with the accompanying drawings.

DESCRIPTION OF THE PREFERRED EMBODIMENT

Next, a fluid pressure control apparatus according to one embodiment of this invention will be described with reference to the drawings.

Figure 1:
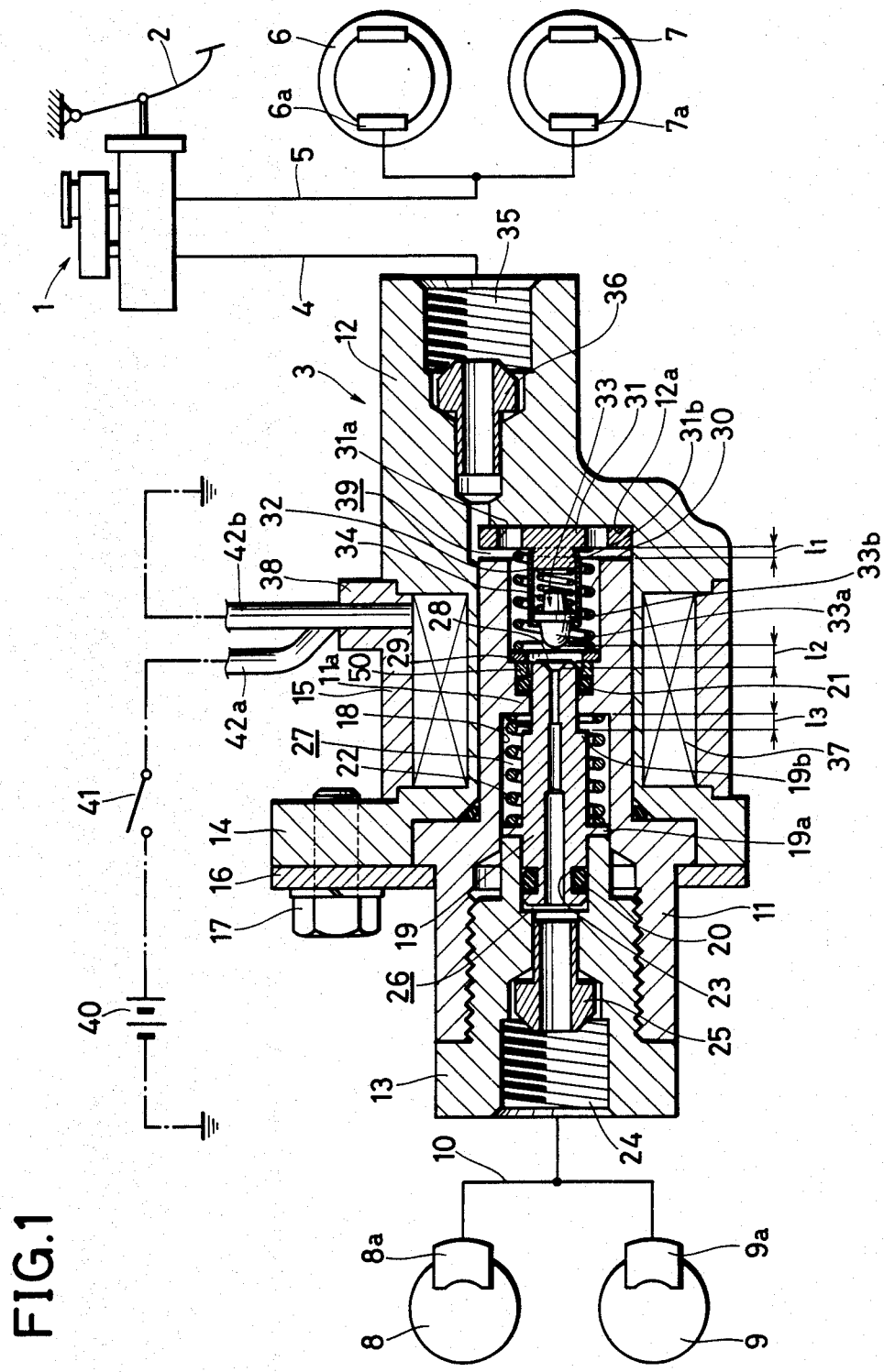
FIG. 1 is a side cross sectional view of a fluid pressure control apparatus according to one embodiment of this invention, showing together a conduit system connected to said fluid pressure control apparatus.

In FIG. 1, a tandem master cylinder 1 is combined with a brake pedal 2. Its one fluid pressure generating chamber is connected through a conduit 4 to a fluid pressure control apparatus 3. Another fluid pressure generating chamber of the tandem master cylinder 1 is connected through a conduit 5 to wheel cylinders 6a and 7a of rear wheels 6 and 7. The fluid pressure control apparatus 3 is connected through a conduit 10 to wheel cylinders 8a and 9a of front wheels 8 and 9. In this embodiment, disc brakes are employed for the front wheels 8 and 9, while drum brakes are employed for the rear wheels 6 and 7.

A main body of the fluid pressure control apparatus 3 consists of a first housing 11 and a second housing 12 which are fitted to each other. A stepped hole 18 is formed in the first housing 11. A cover member 13 having a connecting hole 24 is screwed into the left opening portion of the stepped hole 18. The connecting hole 24 is connected through the conduit 10 to the wheel cylinders 8a and 9a of the front wheels 8 and 9. The first housing 11 is made of magnetic material.

The first housing 11 is fixed through an abutting plate 16 with a flange portion 14 of the second housing 12 by plural bolts 17.

A plunger 19 provided with seal rings 20 and 21 of rubber is slidably fitted into the stepped hole 18 of the first housing 11 and an inside cylindrical portion of the cover member 13, and it is urged leftwards by a spring 22 which is compressed between a flange portion 19a of the plunger 19 and an inner wall portion 11a of the first housing 11. The seal ring 21 is prevented from falling out, by a support ring 50. The flange portion 19a of the plunger 19 contacts with an inner end surface of the cover member 13. Thus, the left or original position of the plunger 19 is determined. An inlet chamber 39 and an outlet chamber 26 are formed at the right and left sides of the plunger 19, respectively. An air chamber 27 is formed between the seal rings 20 and 21.

An axial through hole 23 is made in the plunger 19. In the shown normal condition, the inlet chamber 39 and the outlet chamber 26 are made to communicate with each other through the axial through hole 23. The inlet chamber 39 always communicates through a connecting hole 35 made in the right end portion of the second housing 12, and the conduit 4 connected to the connecting hole 35 with the tandem master cylinder 1. The outlet chamber 26 always communicates through the connecting hole 24 and the conduit 10 with the wheel cylinders 8a and 9a of the front wheels 8 and 9. Reference numerals 25 and 36 represent tube seats for connecting conduits.

Figure 2:
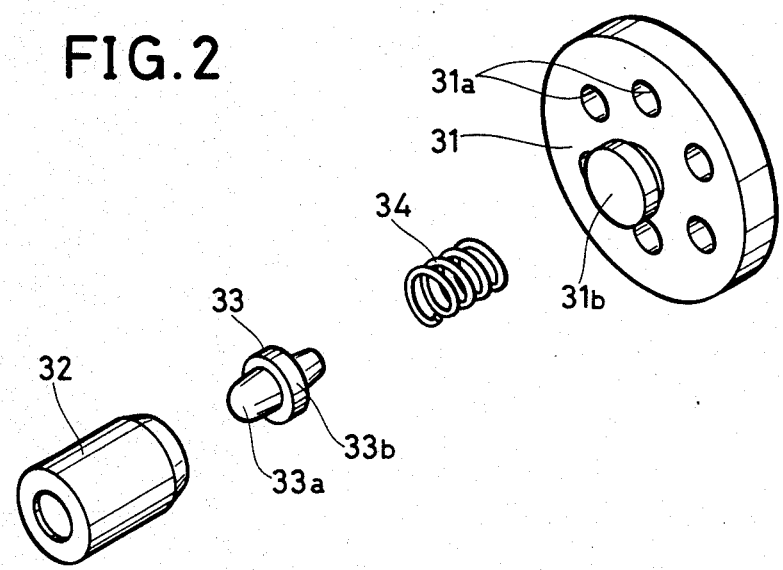
FIG. 2 is an exploded perspective view of an important part of the fluid pressure control apparatus of FIG. 1.

A valve support disc 31 made of magnetic material, as shown in FIG. 2, is arranged in the second housing 12, and it is facing to the right end surface of the first housing 11, spacing by a predetermined distance l1, therefrom. A spring 30 is compressed between the valve support disc 31 and a spring receiver 29 for urging the valve support disc 31 rightwards, which makes the valve support disc 31 contact with an inner wall 12a of the second housing 12, as shown in FIG. 1.

A generally cylindrical valve support member 32 is firmly fitted to a central projection 31b made in the valve support disc 31. A valve body 33 is slidably fitted into a left end opening of the valve support member 32, and it is urged leftwards by a valve spring 34. A flange portion 33b of the valve body 33 contacts with an inward flange portion of the valve support member 32. Thus, the left end position of the valve body 33 is determined in the valve support member 32.

A valve seat 28 is formed as a taper on the right end opening of the plunger 19, and it is facing to a head portion 33a of the valve body 33, spacing by a predetermined distance l2 therefrom. Normally, a stepped portion 19b of the plunger 19 is spaced from the inner wall portion 11a of the first housing 11 by a predetermined distance l3. The following relationship is predetermined among the distances l1, l2 and l3:

$l3 < l2$, and $l3 > l2 - l1$.

The valve body 33 can seat on the valve seat 28 of the plunger 19 under a certain condition. Plural round holes 31a are made in the valve support disc 31, as clearly shown in FIG. 2, for facilitating the communication between the side of the master cylinder 1 and the inlet chamber 39.

An electromagnetic coil 37 is wound on a substantially central portion of the second housing 12. A cylindrical cover member 15 protects the coil 37. Terminal wires 42a and 42b of the coil 37 are led out from openings made in the cylindrical cover member 15. A battery 40 and a reverse switch 41 are connected to the one terminal wire 42a. The reverse switch 41 is normally open. When the driver effects operation for driving the automobile backwards, it is closed by detecting the backward running, and so current from the battery 40 flows through the coil 37.

Next, there will be described operations of the above-described fluid pressure control apparatus 3.

It is assumed that the automobile is running forwards. The respective parts are located in the shown positions (FIG. 1). When the driver treads the brake pedal 2, the fluid pressure of the one fluid pressure generating chamber of the master cylinder 1 is transmitted through the conduit 4, the fluid pressure control apparatus 3 and the conduit 10 into the wheel cylinders 8a and 9a of the front wheels 8 and 9. On the other hand, the fluid pressure of the other fluid pressure generating chamber of the master cylinder 1 is transmitted through the conduit 5 into the wheel cylinders 6a and 7a of the rear wheels 6 and 7.

In the fluid pressure control apparatus 3, the brake fluid flows from the connecting hole 35 to the connecting hole 24 through the inlet chamber 39, the axial hole 23 of the plunger 19 and the outlet chamber 26.

Figure 3A:
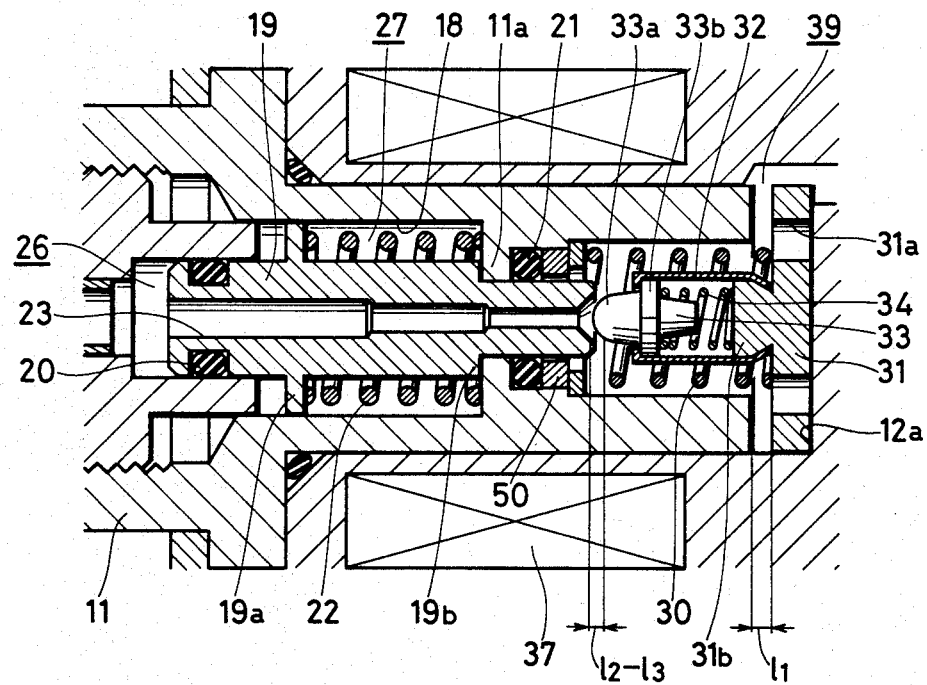
FIG. 3A, FIG. 3B and FIG. 3C are enlarged cross sectional views of the important part of FIG. 2 and associated parts, for explaining operations of the fluid pressure control apparatus.

The left end surface of the plunger 19 for receiving fluid pressure is larger than the right end surface thereof for receiving fluid pressure. Accordingly, when the fluid pressure in the inlet and outlet chambers 39 and 26 becomes higher than a predetermined pressure, the plunger 19 moves rightwards, and the stepped portion 19b of the plunger 19 comes to contact with the inner wall portion 11a of the first second housing 11. Thus, the plunger 19 stops at the inner wall portion 11a, after moving by the predetermined distance l3 as shown in FIG. 3A. Since the distance l2 between the head portion 33a of the valve body 33 and the valve seat 28 of the plunger 19 in the initial positions as shown in FIG. 1, is larger than the distance l3, the head portion 33a of the valve body 33 does not contact with the valve seat 28 of the moved plunger 19.

Thus, the fluid pressure from the master cylinder 1 is transmitted to the wheel cylinder 6a, 7a, 8a and 9a of the rear and front wheels 6 to 9, without being reduced.

Next, there will be described the case that the backwards running automobile is braked.

Figure 3B:
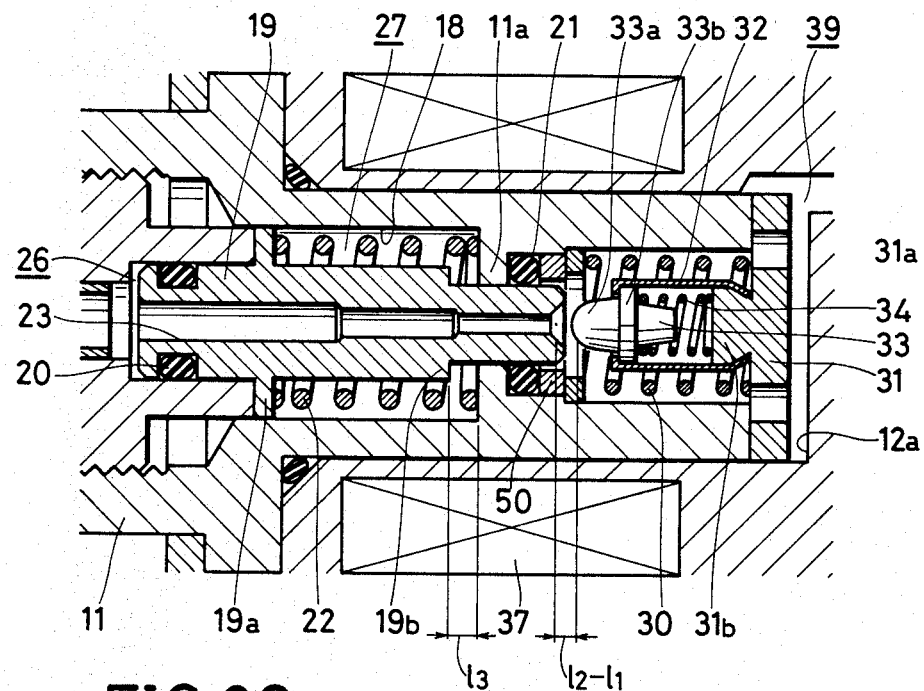

When the driver effects operation for driving backwards the automobile, the reverse switch 41 is closed. Thus, the coil 37 is energized. Magnetic flux is generated in the inside of the coil 37. The first housing 11 is magnetized. The valve support disc 31 is attracted to the end surface of the first housing 11. Thus, it is moved leftwards by the distance l1 and stops to contact with the end surface of the first housing 11. The valve support member 32, therefore the valve body 33 approaches to the valve seat 28 of the plunger 19 by the distance l1, as shown in FIG. 3B.

Figure 3C:
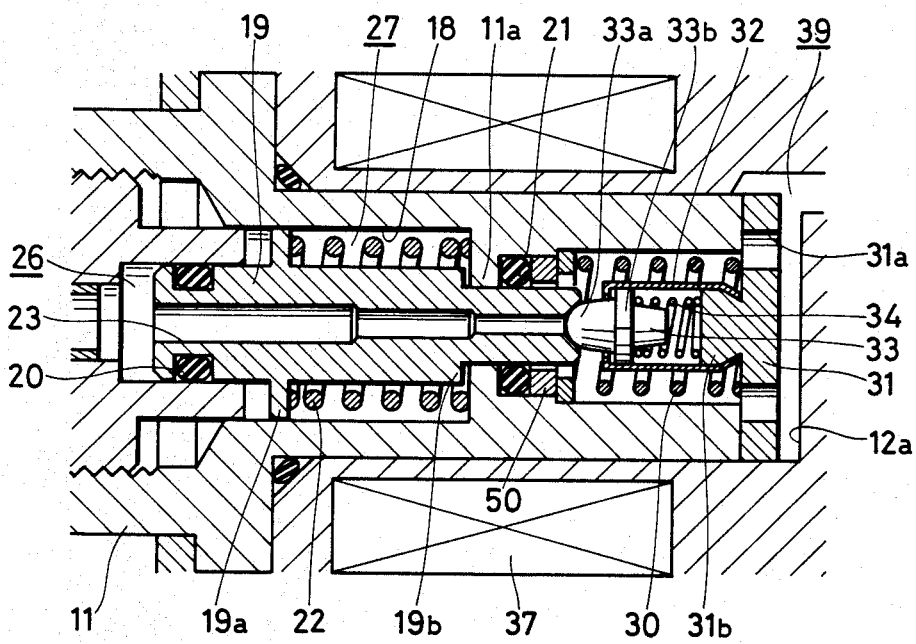

When the brake pedal 2 is trodden, the fluid pressures from the master cylinder 1 are transmitted to the wheel cylinders 8a and 9a of the front wheels 8 and 9, and to the wheel cylinders 6a and 7a of the rear wheels 6 and 7. The automobile begins to be braked. In the fluid pressure control apparatus 3, when the fluid pressure in the inlet chamber 39 and the outlet chamber 26 reaches the predetermined pressure, the plunger 19 begins to move rightwards. The valve body 33 seats on the valve seat 28 of the plunger 19, as shown in FIG. 3C. With the increase of the fluid pressure, the plunger 19 is moved leftwards. Thus, the valve body 33 is again separated from the valve seat 28. With the further increase of the fluid pressure, the plunger 19 is moved rightwards. Thus, the valve body 33 again seats on the valve seat 28. Hereafter, the seating and separation of the valve body 33 are repeated with the increase of the fluid pressure. Thus, the fluid pressure from the master cylinder 1 is transmitted at the predetermined reduction rate to the wheel cylinders 8a and 9a of the front wheels 8 and 9.

As above described, when the automobile is braked during backward running, the braking forces to the front wheels 8 and 9 are reduced in comparison with the fluid pressure of the master cylinder 1. The change of the load distributions to the wheels is considerably decreased. Hitherto, when the 2L-type drum brake is substituted with disk brake for the front wheel, the change of the load distributions is very large. There is a problem on the endurance of the suspension mechanisms for the front and rear wheels. However, according to this embodiment, the large change of the load distributions is prevented, and the suspension mechanisms can be protected.

While the preferred embodiment has been described, variations thereto will occur to those skilled in the art within the scope of the present inventive concepts which are delineated by the following claims.

For example, in the above embodiment, the reverse switch 41 detects the backward running of the automobile for energizing the coil 37. Instead, a switch interlocked with gear change mechanism for backward running may be used for energizing the coil 37.

Further in the above embodiment, the fluid pressure of the master cylinder 1 is supplied directly to the wheel cylinders 6a and 7a of the rear wheels 6 and 7. However, it may be supplied through a proportioning valve, as well known, to the wheel cylinders 6a and 7a of the rear wheels 6 and 7.

What is claimed is:

1. A fluid pressure control apparatus for a vehicle comprising:
    (A) an inlet port connected to a master cylinder;
    (B) an outlet port connected to a wheel cylinder of a brake apparatus for a front wheel;
    (C) a valve apparatus arranged in a path connecting said inlet and outlet ports;
    (D) a movable plunger for closing and opening said valve apparatus, receiving fluid pressure at both sides;
    (E) a first spring for urging said plunger in the direction to open said valve apparatus;
    (F) an electromagnetic coil to be energized by a signal transmitted on the basis of the driver's operation for driving said vehicle backwards;
    (G) said valve apparatus including a valve body which can be separated from and seated on a valve seat formed on said plunger;
    (H) a second spring for urging said valve body to the first position where said valve body cannot contact with said valve seat of the plunger in spite of movement of said plunger; and
    (I) said valve body being moved by energization of said electromagnetic coil to the second position where said valve body can contact with said valve seat of the plunger with movement of said plunger.

2. A fluid pressure control apparatus for a vehicle according to claim 1, in which said inlet and outlet ports are formed in a main body, at least one part of said main body is made of magnetic material, and said valve body is supported by a first support member made of magnetic material that faces said one part of the main body, spacing therefrom by a first predetermined distance l1 at said first position.

3. A fluid pressure control apparatus for a vehicle according to claim 2, in which said plunger has an axial through hole for connecting said inlet and outlet ports, said valve seat is formed at the one end opening of said plunger, and said valve body is facing to said valve seat, spacing therefrom by a second predetermined distance l2 at said first position.

4. A fluid pressure control apparatus for a vehicle according to claim 3, in which said plunger has a stepped portion facing to an inner wall portion of said main body and spacing therefrom by a third predetermined distance l3 at its original position.

5. A fluid pressure control apparatus for vehicle according to claim 4, in which there is the following relationship among said first, second and third predetermined distances l1, l2 and l3: l3 < l2 and l3 > l2 − l1.

6. A fluid pressure control apparatus for a vehicle according to claim 2, in which said first support member is disc-like, a second support member is generally cylindrical and fixed to the central portion of said first support member, said valve body is urged towards said plunger by a valve spring arranged in said second support member, and a flange portion of said valve body is engaged with an inward flange portion of said second support member in its original position.

7. A fluid pressure control apparatus for a vehicle according to claim 6, in which an opening or openings are made in said first support member.

8. A fluid pressure control apparatus for a vehicle according to claim 1, in which said electromagnetic coil is connected in series with a switch for detecting the driver's operation for driving said vehicle backwards.

9. A fluid pressure control apparatus for a vehicle according to claim 2, in which said electromagnetic coil is arranged around said one part of the main body.

* * * * *